(12) United States Patent
Miyaoka

(10) Patent No.: US 7,165,263 B2
(45) Date of Patent: Jan. 16, 2007

(54) METHOD FOR ANNEALING DOMAIN WALL DISPLACEMENT TYPE MAGNETO-OPTICAL DISC AND MAGNETO-OPTICAL DISC

(75) Inventor: Yasuyuki Miyaoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 10/774,443

(22) Filed: Feb. 10, 2004

(65) Prior Publication Data

US 2004/0158849 A1 Aug. 12, 2004

Related U.S. Application Data

(62) Division of application No. 10/043,148, filed on Jan. 14, 2002, now Pat. No. 6,716,489.

(30) Foreign Application Priority Data

Jan. 16, 2001 (JP) ............................. 2001-007562

(51) Int. Cl.
*G11B 7/24* (2006.01)
(52) U.S. Cl. ..................................... 720/718
(58) Field of Classification Search ............... None
See application file for complete search history.

(56) References Cited

U.S. PATENT DOCUMENTS

| 5,966,349 A * | 10/1999 | Suwabe et al. ........... 369/13.45 |
|---|---|---|
| 6,027,825 A | 2/2000 | Shiratori et al. ............ 428/694 |
| 6,249,489 B1 | 6/2001 | Fujii et al. .................. 369/131 |
| 6,572,957 B1 * | 6/2003 | Aratani ....................... 428/212 |
| 6,944,100 B1 * | 9/2005 | Sakamoto et al. ....... 369/13.08 |
| 2003/0117905 A1 * | 6/2003 | Tsutsui et al. ........... 369/13.05 |
| 2004/0163097 A1 * | 8/2004 | Miyakoshi et al. ......... 720/718 |

FOREIGN PATENT DOCUMENTS

| JP | 6-290496 | 10/1994 |
| JP | 11-273170 | 10/1999 |
| JP | 11-339340 | 12/1999 |

* cited by examiner

*Primary Examiner*—Allen Cao
(74) *Attorney, Agent, or Firm*—Fitzpatrick, Cella, Harper & Scinto

(57) ABSTRACT

A manufacturing method of a domain wall displacement type magneto-optical recording medium comprises the steps of depositing a magnetic layer on a substrate to prepare a disc, and irradiating the magnetic layer with a converged light beam while applying a magnetic field and annealing the magnetic layer a converged light beam between information tracks. A domain wall displacement type magneto-optical disc comprises a domain wall displacement layer in which a domain wall displaces, a memory layer that holds a recording magnetic domain according to information, a switching layer that is provided between the domain wall displacement layer and the memory layer and has a Curie temperature lower than that of those layers, and a disconnecting area that is provided in the domain wall displacement layer and disconnects a switching connection between information tracks, wherein the polarity of a residual magnetization at a boundary between the information track and the disconnection area is oriented in a certain direction.

3 Claims, 9 Drawing Sheets

METHOD FOR ANNEALING DOMAIN WALL DISPLACEMENT TYPE MAGNETO-OPTICAL DISC AND MAGNETO-OPTICAL DISC

CROSS-REFERENCE TO RELATED APPLICATIONS

This application is a division of application Ser. No. 10/043,148; now U.S. Pat. No. 6,716,489, filed on Jan. 14, 2002.

BACKGROUND OF THE INVENTION

1. Field of the Invention

The present invention relates to a domain wall displacement readout type magneto-optical disc and a manufacturing method thereof and, more in particular, to a method for annealing anneal tracks that exist at both sides of an information recording track.

2. Related Background Art

As a rewritable high density recording system, there is a system available wherein, by using thermal energy of a semiconductor laser, a magnetic domain is written in a magnetic thin film to record information and, by using a magneto-optical effect, this information is read. Further, in recent years, there has been an increasing demand for further increasing the recording density of the magneto-optical disc of this system so as to make it as a large-capacity recording medium. By the way, a line recording density of the magneto-optical disc and the like largely depends on a laser wave length $\lambda$ of a reproduction optical system and a numerical aperture NA of an objective lens. In other words, when the laser wave length $\lambda$ of the reproduction optical system and the numerical aperture NA of the objective lens are decided, the diameter of a beam waist is decided and, therefore, a spatial frequency at the time of reproducing a recorded domain has a detectable limit only at about $2 NA/\lambda$.

Accordingly, in order to realize high density by the conventional magneto-optical disc, it is necessary to shorten the laser wave length of the reproduction optical system and enlarge the NA of the objective lens. However, there is a limit to improvement of the laser wave length and the numerical aperture of the objective lens. For this reason, a technology to think out a constitution of the recording medium and a reading method and improve recording density is being developed.

For example, in Japanese Patent Application Laid-Open No. 06-290496, the magneto-optical disc and its manufacturing method are disclosed, the disc using a perpendicular magnetic anisotropy multi-layer film having at least s domain wall displacement layer magnetically linked, a switching layer and a memory layer.

This method uses an ingenious mechanism, wherein, at the time of reproduction, a thermal gradient to be generated by irradiation of an optical beam is used and the domain wall of a recorded mark of the domain wall displacement layer is displaced without changing recorded data in the memory layer, and the domain wall displacement layer is magnetized so that a part of an optical beam spot area is uniformly magnetized and a change of the polarization plane of the reflected light of the optical beam is detected, thereby reproducing a recorded domain of the cycle below a diffraction limit.

By using this reproduction system, a reproduction signal becomes rectangular (FIG. 11D), and it is possible to reproduce the recorded mark of the cycle below the diffraction limit of a light without lowering the reproduction signal amplitude by depending on an optical resolving power, and the magneto-optical disc capable of considerably improving the recording density and a transfer velocity becomes possible.

Note that, in this type of magneto-optical disc, in order to utilize the temperature gradient by irradiation of the light beam so as to easily cause the displacement of the domain wall of recorded mark of the domain wall displacement layer, a laser beam of high power is irradiated at the portion of adjacent two pieces of the anneal tracks (guide grooves) which make the information recording track of the magneto-optical disc exist between them, and a magnetic layer of the anneal track (guide groove) is annealed at high temperature and subjected to an annealing process which degenerates a magnetic layer of the portion of the anneal track (guide groove). By this annealing process, a switched connection between the information recording tracks is disconnected and the domain wall is not formed along the side portion of the information domain track of the recorded mark. As a result, the action of a domain wall coercivity is reduced, and more stabilized displacement of the domain wall becomes possible. This annealing process can obtain a good reproduction signal.

The reproducing action of the domain wall replacement type magneto-optical disc will be described by using FIGS. 11A to 11D. Here will be dealt with the constitutions of three layers: a memory layer which governs the storing of the recorded mark; the domain wall displacement layer where the domain wall displaces and directly contributes to the reproduction signal; and a switching layer which switches a link status between the memory layer and the domain wall displacement layer.

FIG. 11A is a typical view which shows a magnetic domain reproducing state. A thick line 111 shows a domain wall of the domain wall displacement layer, and a narrow line 112 shows the domain wall of the memory layer only. FIG. 11B shows a state graph of a recording film, FIG. 11C a temperature state graph of a medium and FIG. 11D the reproduction signal. Note that the two pieces of the anneal tracks (guide grooves) which make the information recording track exist between them, as described above, subjected to the annealing process where a magnetic layer is degenerated by irradiation of high powered laser beam. At the time of reproduction, the anneal track is heated until a Ts temperature condition (FIG. 11A) where the domain wall of the domain wall displacement layer of a domain wall displacement medium is displaced by irradiation of a light beam 116. Here, the Ts is the Curie point of the matter which constitutes the switching layer, and the switching layer 22 (FIG. 11B) is in a link state with the memory layer 21 and the domain wall displacement layer 23 by the switched connection in a low temperature area. When the magneto-optical disc displaces in the direction shown by an arrow mark 114 and is heated more than the Ts temperature by irradiation of the light beam, the link between the domain wall displacement layer and the memory layer is put into a disconnected state (inside of a Ts constant temperature line shown by the Ts of FIG. 11A. For this reason, as soon as the domain wall of the recorded mark arrives at this Ts temperature area, an effect of the annealing process (annealing process portion by laser is shown by reference numeral 113 in FIGS. 11A to 11D) of the two pieces of the anneal tracks (guide grooves) adjacent to the information recording track also takes place, and the domain wall of the domain wall displacement layer instantaneously displaces to the position where the domain wall can stably exist energy-wise in relation to the temperature gradient of the domain wall displacement layer, that is, to the direction of an arrow mark 115 so that the domain wall can cross the information recording track at the highest temperature of the line density direction of the temperature rise by the light beam irradiation. In this way, a large portion of magnetic state of an area S which is covered by the reproduction light beam becomes the same and, therefore, in the usual light beam reproduction principle, even if it is a minute recorded mark which is not possible to reproduce, a reproduction signal nearly in a rectangular shape as shown in the drawing can be obtained.

SUMMARY OF THE INVENTION

The present invention provides a domain wall displacement type magneto-optical disc where an error rate and a jitter of a reproduction signal are improved, and a manufacturing method of the disc.

According to an aspect of the present invention, there is provided a manufacturing method of a domain wall displacement type magneto-optical recording medium comprising the steps of:

depositing a magnetic layer on a substrate to prepare a disc; and irradiating the magnetic layer with a converged light beam while applying a magnetic field and annealing the magnetic layer a converged light beam between information tracks.

According to another aspect of the present invention, there is provided a domain wall displacement type magneto-optical disc comprising:

a domain wall displacement layer in which a domain wall displaces;

a memory layer that holds a recording magnetic domain according to information;

a switching layer that is provided between the domain wall displacement layer and the memory layer and has a Curie temperature lower than that of those layers; and a disconnecting area that is provided in the domain wall displacement layer and disconnects a switching connection between information tracks;

wherein the polarity of a residual magnetization at a boundary between the information track and the disconnection area is oriented in a certain direction.

DETAILED DESCRIPTION OF THE PREFERRED EMBODIMENTS

Figure 1:
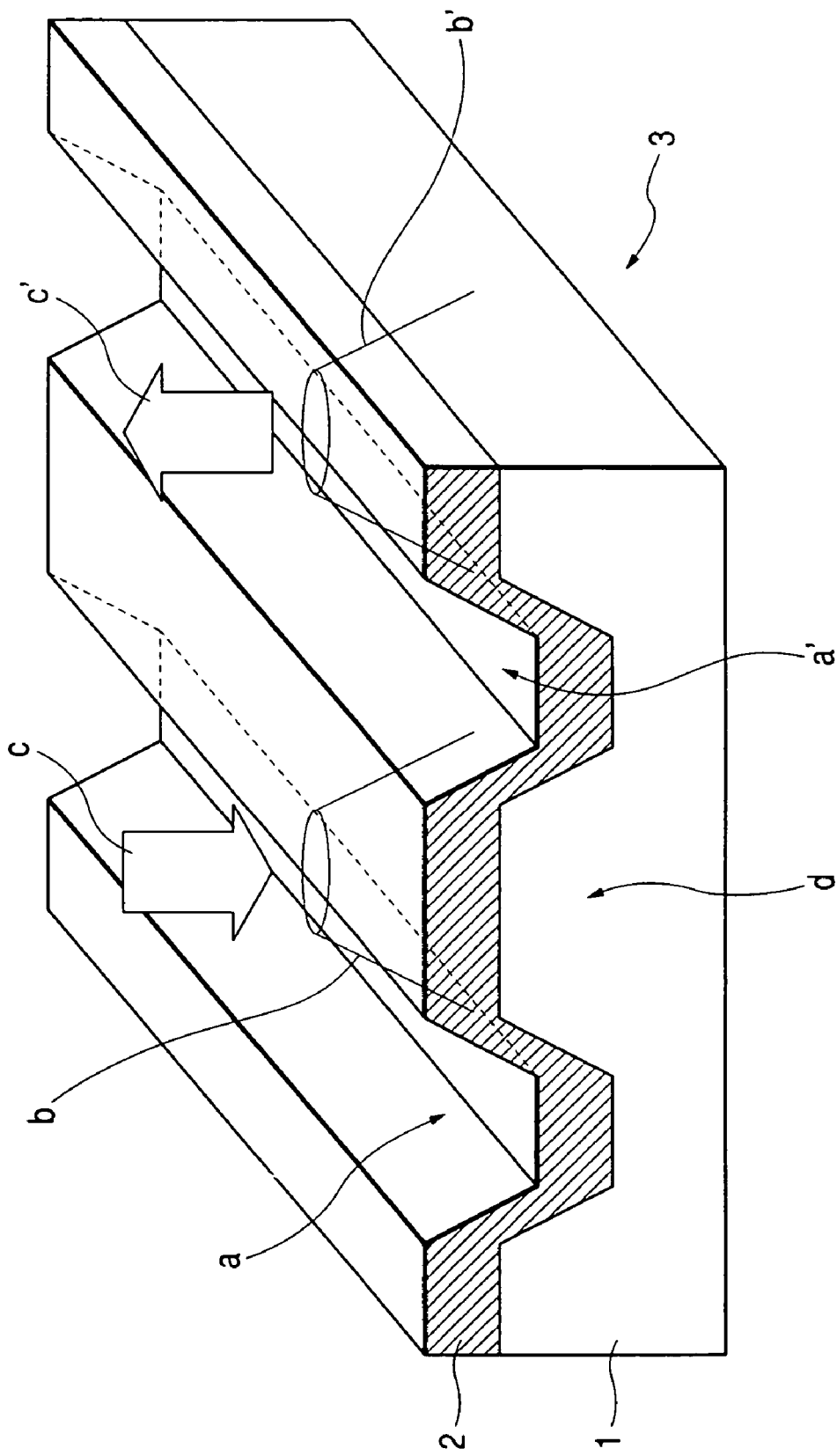
FIG. 1 is a view to explain a manufacturing method of the present invention.

FIG. 1 shows a schematic diagram to show a property of an annealing method of a magneto-optical disc of the present invention. It shows a sectional view of a magneto-optical disc 3 at the stage where a step of laying on a magneto-optical disc substrate 1 comprising glass or plastic as a material a magnetic layer 2 which includes at least a domain wall displacement layer where the domain wall displaces, a memory layer which holds information as a recording magnetic domain and a switching layer provided between the domain wall displacement layer and the memory layer and having Curie temperature lower than those layers has been completed. While any protective layer is still not formed at the stage of FIG. 1, it does not matter whether the protective layer exists when annealing the disc. Here, a character d denotes one of the information recording tracks, and the information track is an area which forms a recording magnetic domain to hold the information such as a user data etc. In general, this convex portion provided on the substrate is referred to as a land. Magneto-optical disc of FIG. 1 has a constitution in which the light beam for use of forming an anneal track enters from the back side of the substrate where the magnetic layer 2 is not formed. Characters a and a' which make an information recording track d exist between them denote anneal tracks, which are formed by a laser annealing with a higher light intensity than that at writing an information on the information recording track d.

In the present drawing, the anneal tracks a and a' serve also as the guide grooves to control the light beam at the center of the information recording track d in the reproduction step. In general, the concave portion provided on the substrate is referred to as a groove.

In the present embodiment, the lands (convex portions) on the substrate 1 are taken as information recording tracks and the grooves (concave portions) as the anneal tracks, but the constitution of the magneto-optical disc is not limited to this. For example, a constitution wherein the lands (convex portions) are taken as the anneal tracks and the grooves (concaves) are taken as the information recording tracks is also allowable.

The laser spots denoted by characters b and b' show the converged light beams when annealing anneal tracks a and a', which enter from the back of the substrate.

In the drawing, the laser spots of b and b' are illustrated as if the two points were irradiated at the same time. This is to clarify that the directions of annealing magnetic fields applied to the two anneal tracks which are adjacent to the information recording track are different.

Characters c and c' show the polarities of applied magnetic fields in the case where the anneal tracks a and a' are annealed. In the present embodiment, the direction of the applied magnetic field is from one side of the substrate on which the magnetic layer 2 is provided to the other side of the substrate (i.e., the back side of the substrate) when anneal track a is annealed, and the direction of the applied magnetic field is from the back side of the substrate to the side on which the magnetic layer 2 is provided when anneal track a' is annealed. In addition, the annealing magnetic fields at the adjacent anneal tracks with the information recording track d made to exist between them have opposed polarities.

Figure 2:
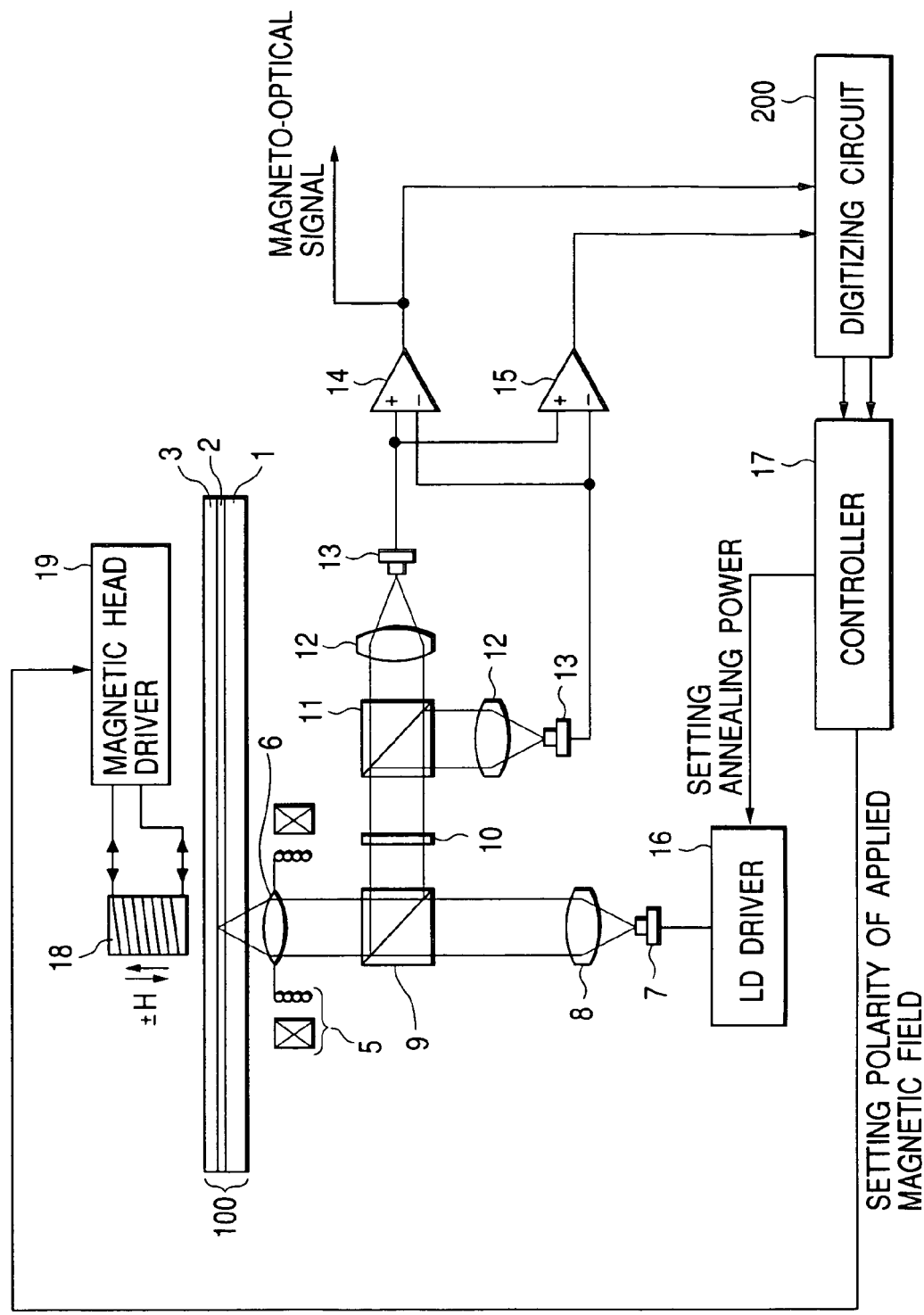
FIG. 2 shows an annealing device to be used in the manufacturing method of the present invention.

In order to form the anneal tracks by applying thus annealing magnetic fields perpendicular to the substrate surface, a device as shown in FIG. 2 is suitable.

A magneto-optical disc 100, wherein a magnetic layer 2 is formed on a magneto-optical disc substrate 1 made of glass or plastic and further a protective layer 3 is formed, is held on a spindle motor with a magnetic chucking and the like, and is constituted such that it is rotatable against an axis of rotation.

A laser light for forming the anneal track generated from a semiconductor laser light source 7 is changed to a parallel ray by a collimator lens 8 and passes through a beam splitter 9 and is converged by a condenser lens 6. Then a predetermined position of the magneto-optical disc 100 is irradiated with the converged laser light as a beam from the back. Note that the condenser lens 6 is driven by a drive actuator 5.

On this occasion, the condenser lens 6 is constituted such that it is controlled by actuator 5 to move in a focusing direction and a tracking direction so that the laser light successively places a focus on the magnetic layer 2. The condenser lens 6 also moves along the guide groove engraved on the magneto-optical disc.

On the other hand, the reflected light which reflected from the surface of magneto-optical disc surface passes through a route in reverse to the incident light and arrives at the beam splitter 11 and is reflected at a right angle and passes through a $\lambda/2$ plate 10. This $\lambda/2$ plate is a filter to rotate a the reflected light at 90° in the polarizing direction of the incident light.

Further, the reflected light enters the polarized beam splitter 11 and is put into two condenser lenses 12 by the polarity of the magneto-optical disc magnetization of the magneto-optical disc 100. Two pieces of photo sensors 13 detect the intensities of the incident lights which enter the sensors respectively. The detected resultants are amplified respectively by a differential amplification circuit 14 which differentially amplifies the signal converged and detected respectively according to the polarization direction and by a summing amplification circuit 15 which summing-amplifies the signal converged and detected respectively according to the polarization direction. A light magnetic signal and by a summing signal from the differential amplification circuit 14 and the summing amplification circuit 15 are synthesized and binarized by a digital circuit 200 and outputted to a controller 17. In addition, the number of rotations of the magneto-optical disc, an annealing radius, an annealing sector information and so forth are inputted to controller 17, and a signal to control an annealing power is outputted to a LD driver 16. The LD driver 16 irradiates a laser to a substrate 1 under a predetermined condition according to that signal.

Further, the controller also controls a magnetic head driver 19 at the same time, and outputs a signal which controls the polarity of the annealing magnetization and the like.

Reference numeral 18 denotes a magnetic head to apply a magnetic field to a laser-irradiated portion of magneto-optical disc 1 when forming an anneal track, and sandwiches the magneto-optical disc 100 and is arranged in a manner that opposes to condenser lens 6. Magnetic head 18 is used to record information and to reproduce it. In the annealing, a semiconductor laser 7 irradiates the LD driver 16 with an anneal laser power and, at the same time, the magnetic head 18 is allowed to generate a perpendicular magnetic field of a polarity corresponding to a polarity signal of a magnetic field applied for annealing an anneal track (hereinafter referred to as "annealing applied magnetic field") by magnetic head driver 19. The magnetic head 18 is constituted such that, coupled with an optical head, it moves in the radial direction of the magneto-optical disc 1 and, at the annealing step, applies a magnetic field successively to the laser-irradiated portion of the magneto-optical disc 3 to perform a desired annealing.

However, means which reproduces the information from the reflected light from the magneto-optical disc is not necessarily required. Such a means is utilized as means to detect a pre-format and the like and to reproduce a magneto-optical signal when controlling a timing to switch the polarity of the annealing applied magnetic field by the reflected light from the magneto-optical disc, or when checking whether a desired property develops in the information recording track or not after the annealing of the anneal track. In the case, a construction where a parameter such as a laser power according to the annealing, an applied magnetic field or the like is changed into a value relative to the recording or reproduction by the controller 17 is required.

Figures 3A, 3B, 3C, 3D:
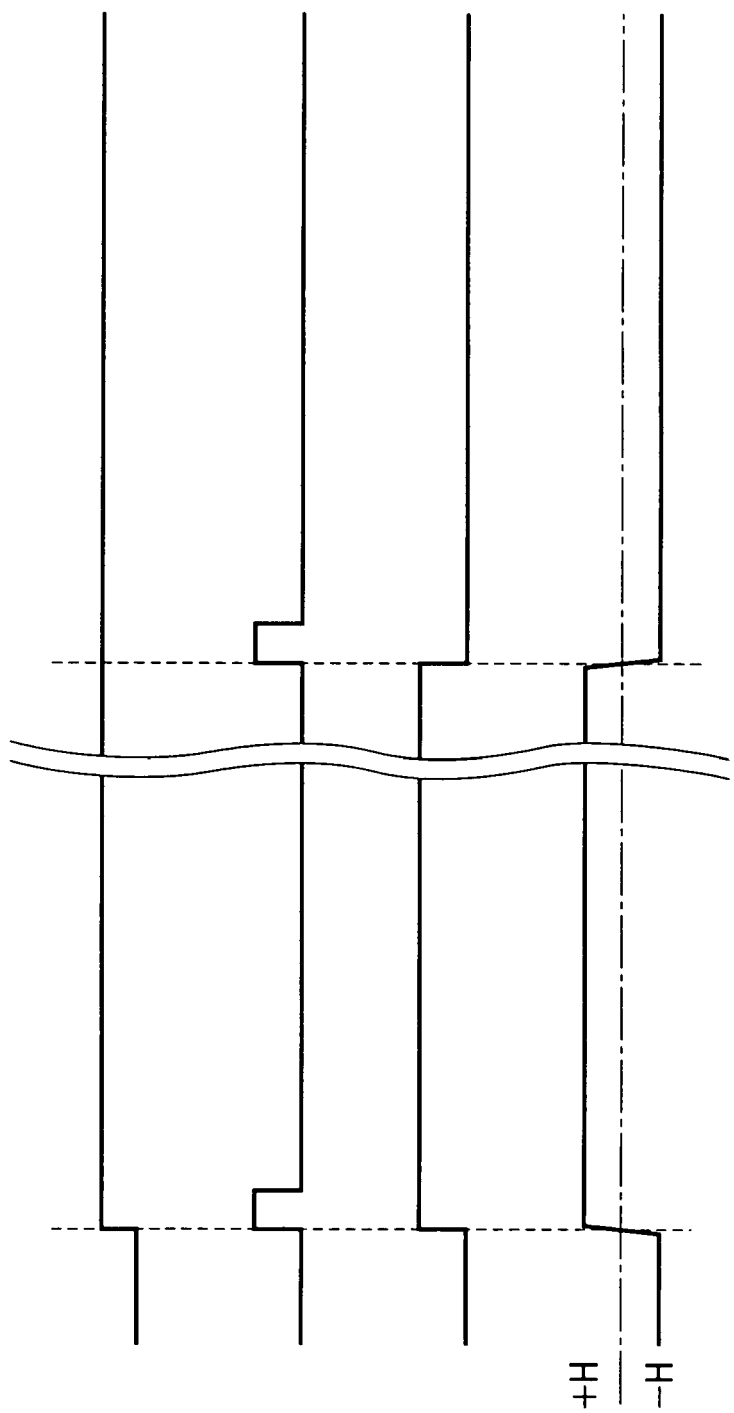
FIGS. 3A, 3B, 3C and 3D show a timing chart to show the action of a first embodiment of the present invention.

In the idea of the above described annealing method and the annealing means, the action of annealing the anneal track will be described by using FIGS. 3A to 3D. FIG. 3A shows an annealing power ON/OFF signal which shows the start of the annealing, FIG. 3B shows an applied magnetic field polarity change timing signal which shows a timing to change the polarity of the applied magnetic field, FIG. 3C shows an applied magnetic field polarity control signal which controller 17 outputs to magnetic head driver 19, and FIG. 3D shows a generated magnetic field of magnetic head 18. An irradiating power of the laser is set to a desired annealing power by an annealing start command from controller 17. Although the annealing power is different depending on a property of the magneto-optical disc, but it is typically about two times that of the recording power. At the same time of the irradiation of the laser power, the annealing magnetic field is applied by the magnetic head 18. On this occasion, the polarity of the applied annealing magnetic field is allowed to generate the magnetic field of the polarity corresponding to a polarity of the applied magnetic field control signal from the controller 17. As described below, the absolute value of the magnetic field intensity is preferable to be larger than about 50 Oe. In order to execute the property of the present invention, it is necessary to switch the polarity of the applied magnetic field at least more than one time for one cycle, and this switching timing is controlled by an applied magnetic field polarity change timing signal from the controller 17. The applied magnetic field polarity change timing signal can be formed by counting a clock for rotation control of the spindle and can be also formed by detecting the reflected light such as a phase pit which causes a change of reflectivity embedded in advance in the anneal track of the magneto-optical disc as an applied magnetic field change timing. The later makes it possible to control the magneto-optical disc by higher position accuracy.

Since the switched portion of the polarity of the annealing applied magnetic field is considered to have adverse effect on the information recording track, the area where the polarity of the annealing applied magnetic field is switched is preferably the area where the adjacent information recording track is not an user data area, for example, preferably a header area which shows a sector position information and the like. Further, an applied magnetic field polarity switching area may be specially provided. By these means and processes, it is possible to control the applied magnetic field to a predetermined magnitude and polarity in annealing the anneal tracks adjacent to both sides of the information recording track.

Figure 4:
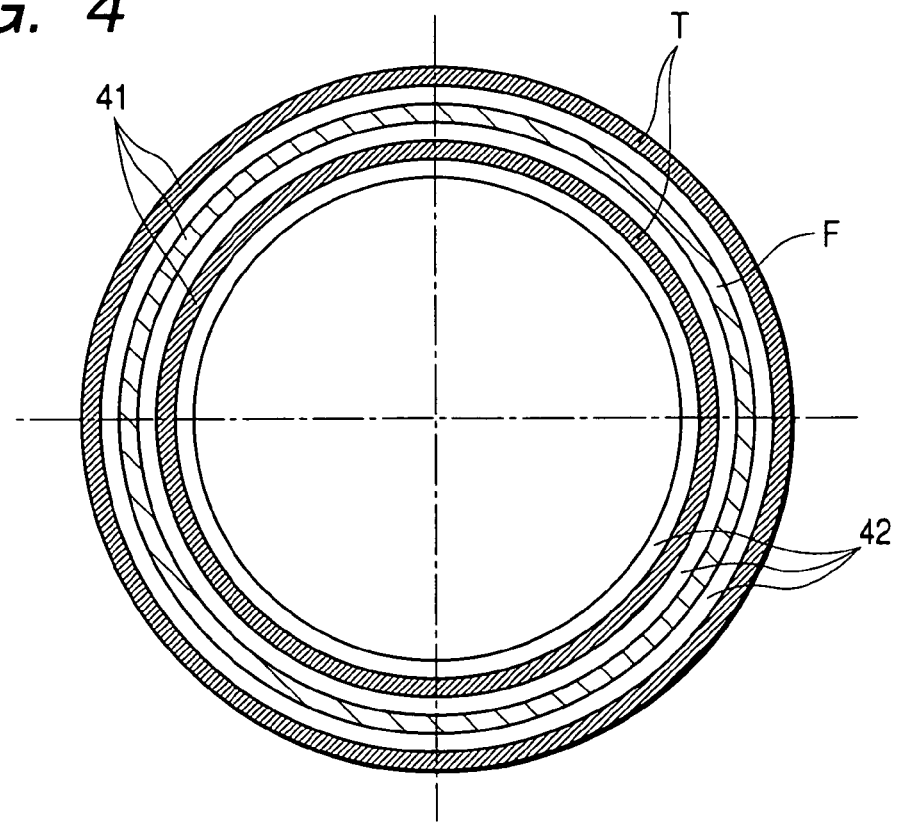
FIG. 4 shows an example of an application of an annealing magnetic field.
Figure 5:
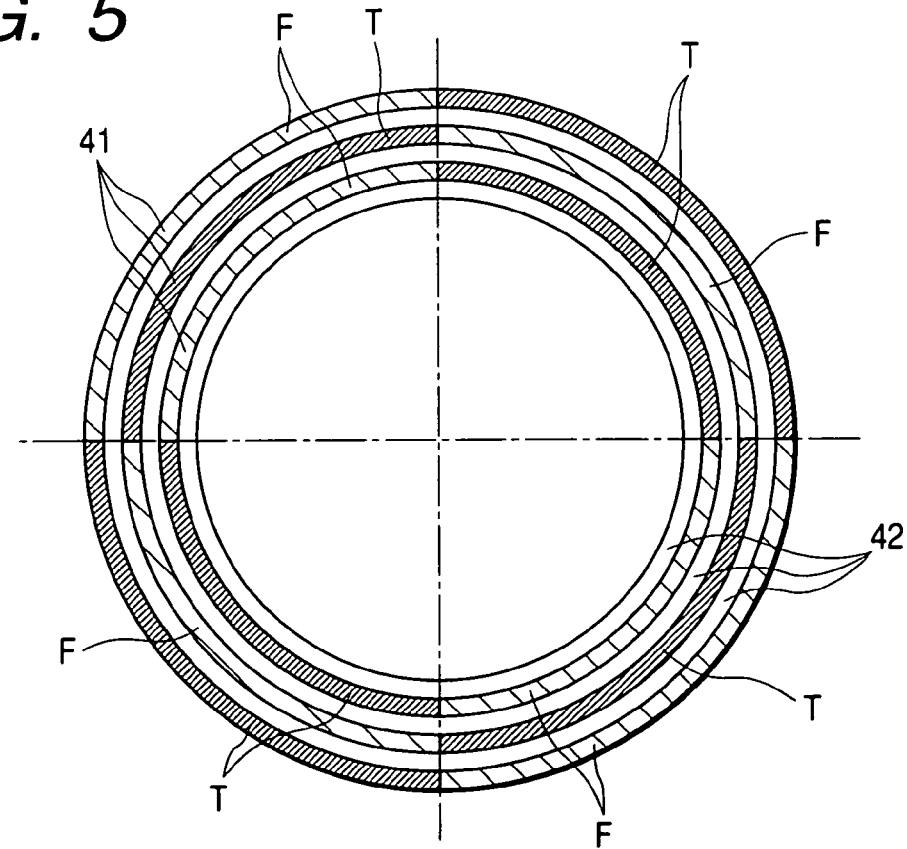
FIG. 5 shows another example of the application of the annealing magnetic field.

Examples of the applied magnetic field polarity change timing in a case where the magneto-optical disc is annealed by these means are shown in FIGS. 4 and 5. In FIGS. 4 and 5, reference numeral 41 denotes the anneal track, and reference numeral 42 denotes the information recording track. Among the anneal tracks, the hatching portion shown by T has the applied magnetic field at the time of annealing in the upward direction to the plane of the drawing, and among the anneal tracks, the hatching portion shown by F has the applied magnetic field at the time of annealing in the downward direction to the plane of the drawing. In FIG. 4, switching of the polarity of the annealing magnetic field is performed only when the magnetic field-applying means moves to the next anneal track and the switching is one time for one cycle of the anneal track. In contrast to this, in FIG. 5, since the anneal track of one cycle is divided into four continuous magnetic areas, the switching of the polarity of the applied magnetic field is performed five times. The white portion 42 indicates the information recording track in FIG. 5. The figure shows that the polarities of the annealing magnetic fields in adjacent portions T and F of the recording tracks are reversed.

The timing of switching the applied magnetic field is not limited to the above. The gist of the switching is adaptable not only to CAV but also to format, of zone CAV, CLV and zone CLV, assuming that the applied magnetic fields at the time of annealing anneal tracks adjacent to both sides of an information track have opposite polarities.

(Embodiment 1)

The present invention was executed by the device described in FIG. 2. The device of FIG. 2 applies an annealing magnetic field perpendicular to the magneto-optical disc surface.

Figure 6:
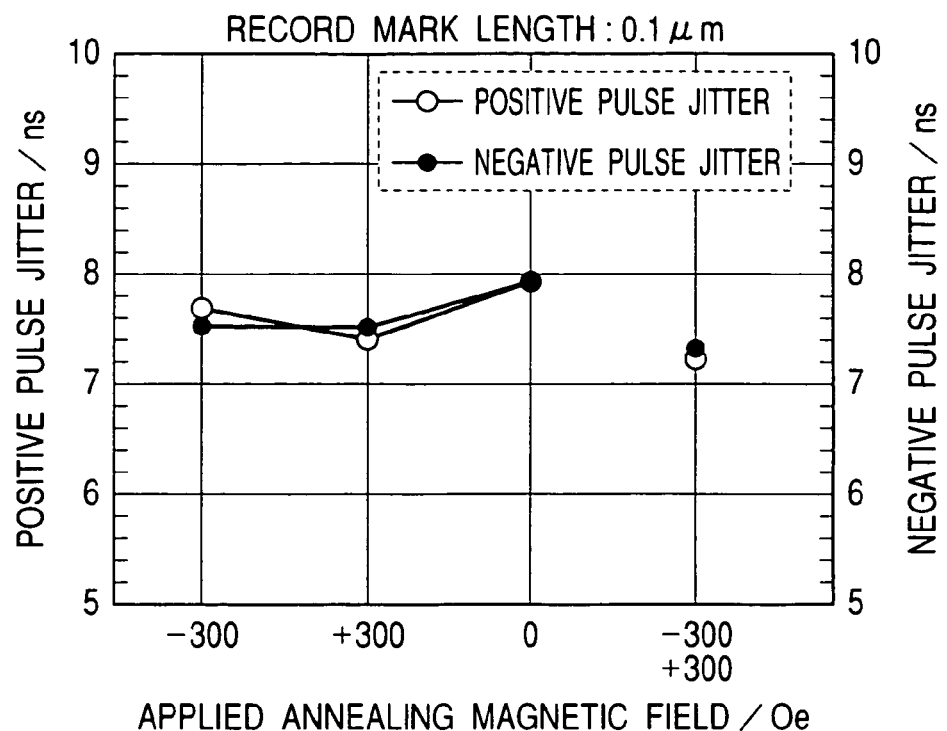
FIG. 6 shows a jitter property graph of the first embodiment of the present invention.
Figure 7:
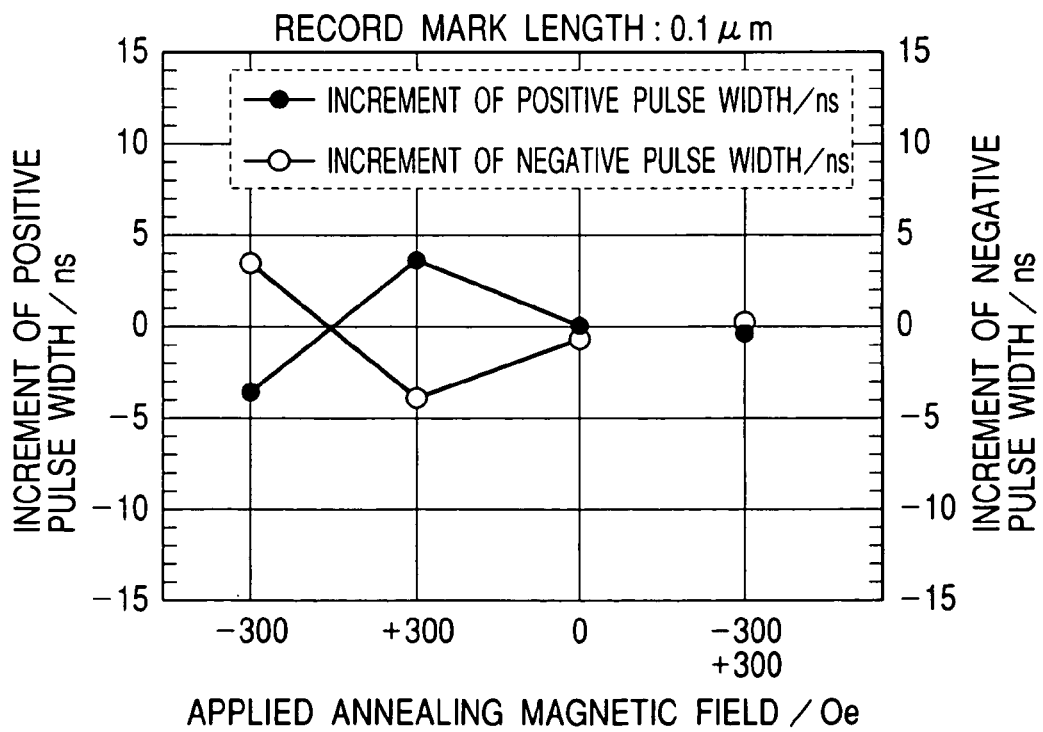
FIG. 7 shows a pulse width fluctuation property graph by a second embodiment of the present invention.

FIGS. 6 and 7 show properties in embodiments of the present invention and the comparative examples, as explained below.

After completing the formation of the magnetic layer, the annealing of the anneal track was conducted by laser beam under various conditions.

In FIG. 6, the ordinate shows a jitter property. The jitter property is better as the value of the jitter property is smaller. The abscissas of FIG. 6 shows applying methods of the magnetic field at the time of annealing the anneal track.

Described in order from the left side on the axis of the abscissa are the methods (1) wherein, as comparative example 1, the applied magnetic fields at both of the anneal tracks adjacent to the information recording track were taken as −300 Oe and were applied to all the anneal tracks the annealing magnetic field of the same polarity at the same magnitude.

(2) wherein, as comparative example 2, the applied magnetic fields at both of the anneal tracks adjacent to the information recording track were taken as +300 Oe, which was the same as (1) in annealing magnetic field.

(3) wherein, as comparative example 3, the applied magnetic fields at both of the anneal tracks adjacent to the information recording track were taken as 0 Oe, and the annealing magnetic field was not applied at the time of forming the anneal track.

(4) wherein, as example 1, the applied magnetic fields at both of the anneal tracks adjacent to the information recording track were inversed in polarity by one cycle interval, and the generated magnetic field was taken as ±300 Oe, which corresponds to FIG. 4.

FIG. 7 is the same as FIG. 6 in axis of abscissas, and the axis of ordinates shows a aberration amount of the reproduction signal pulse width in relation to the regular pulse width in the reproduction signal. If the pulse width is near to "0", it shows that it is near to the desired pulse width.

Table 1 shows annealing magnetic field applied conditions and reproduction properties.

TABLE 1

| | Annealing magnetic field (magnetic field applied in the direction perpendicular to the disc surface) and reproduction property. | | | |
|---|---|---|---|---|
| | Comparative Example 1 | Comparative Example 2 | Comparative Example 3 | Example 1 |
| Condition of Annealing Magnetization Applying | | | | |
| Annealing Magnetization Applied | available | available | not available | available |
| Reversal of Polarity | not available | not available | not available | available |
| Intensity of Annealing Magnetization | +300 | −300 | 0 | ±300 |
| Length of Continuous Magnetization Area | one cycle | one cycle | — | one cycle |
| Reproduction Property | | | | |
| Jitter Property Estimation | good | good | bad | good |
| Pulse Width Property Estimation | bad | Bad | a little bad | good |
| Overall Estimation | bad | bad | bad | very good |

Regarding jitter property, example 1 shows that a jitter value is low. (FIG. 6, Table 1)

The pulse widths regarding the three types of the method for applying the annealing magnetic field were estimated. Comparative examples 1 and 2 have large aberrations in the reproduction signal pulse width (FIG. 7, Table 1). Embodiment 1 has the most excellent performance among the four experiments even in pulse width.

From the result of these experiments, it is evident that, in the case where the applied magnetic fields at both of the anneal tracks adjacent to the information recording track are inversed at intervals of every one cycle and the generated magnetic field is taken as ±300 Oe, the jitter property is excellent and the pulse width fluctuation is not generated, and it is the most suitable annealing condition among the above described conditions.

In this way, the remanent magnetization at the boundary between the anneal track, where, though there is a deterioration of the magnetic property due to the laser annealing of the present invention, the magnetic property is not lost completely, and the information recording track is taken as a predetermined polarity by both of the adjacent anneal tracks which make the information recording track exist between them, so that the influence for the magnetic recording track in the information recording track is offset and the influence can be equalized. In this way, it is possible to provide the magneto-optical disc, which can obtain the reproduction signal of high quality, and further improve the recording density.

The remanent magnetization at the time of the above described annealing has been confirmed not to be inversed by a recording power usually used and a recording magnetic field usually used.

(Embodiment 2)

Figure 8:
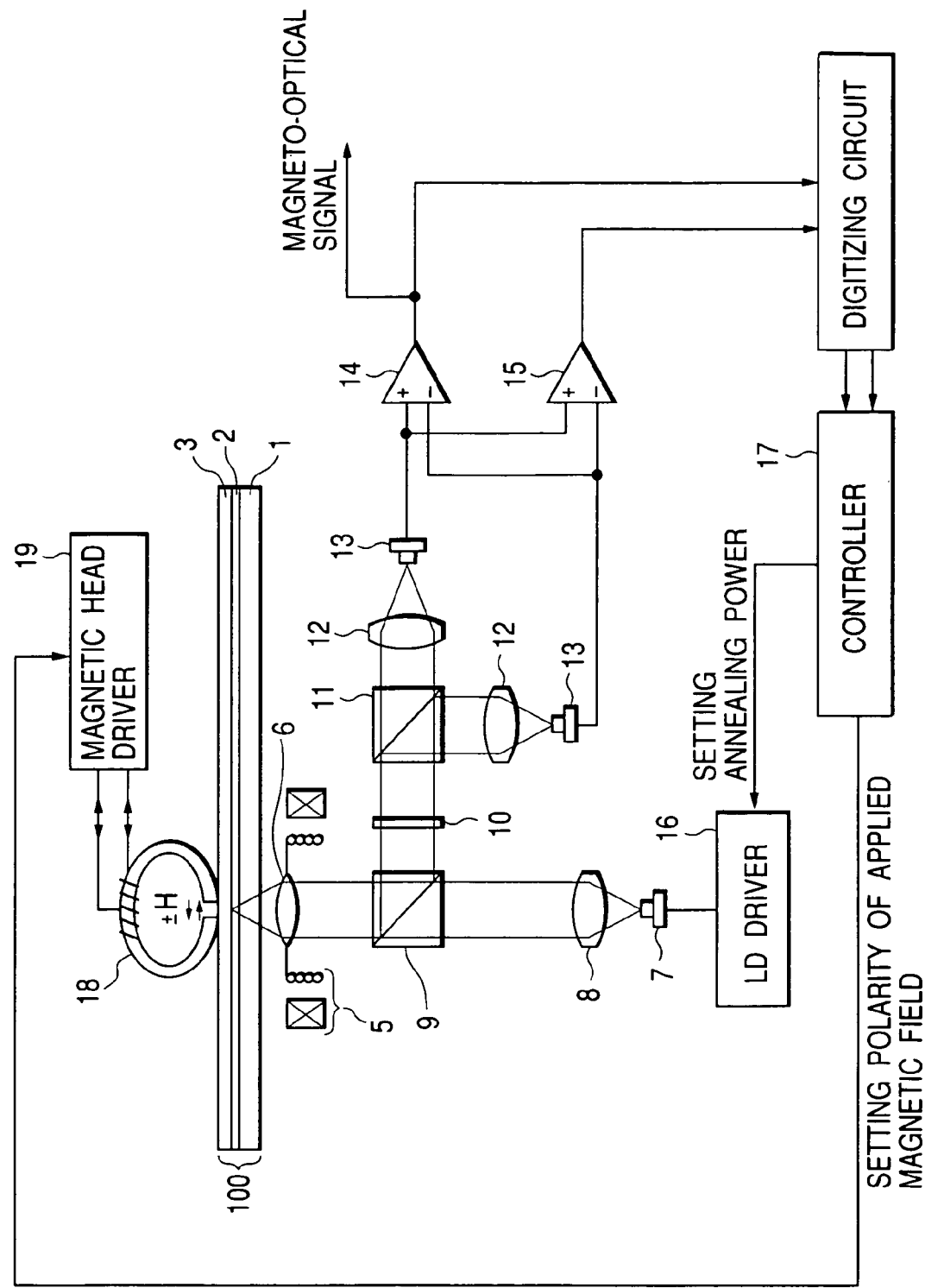
FIG. 8 shows another example of an annealing device to be used in the manufacturing method of the present invention.
Figure 9:
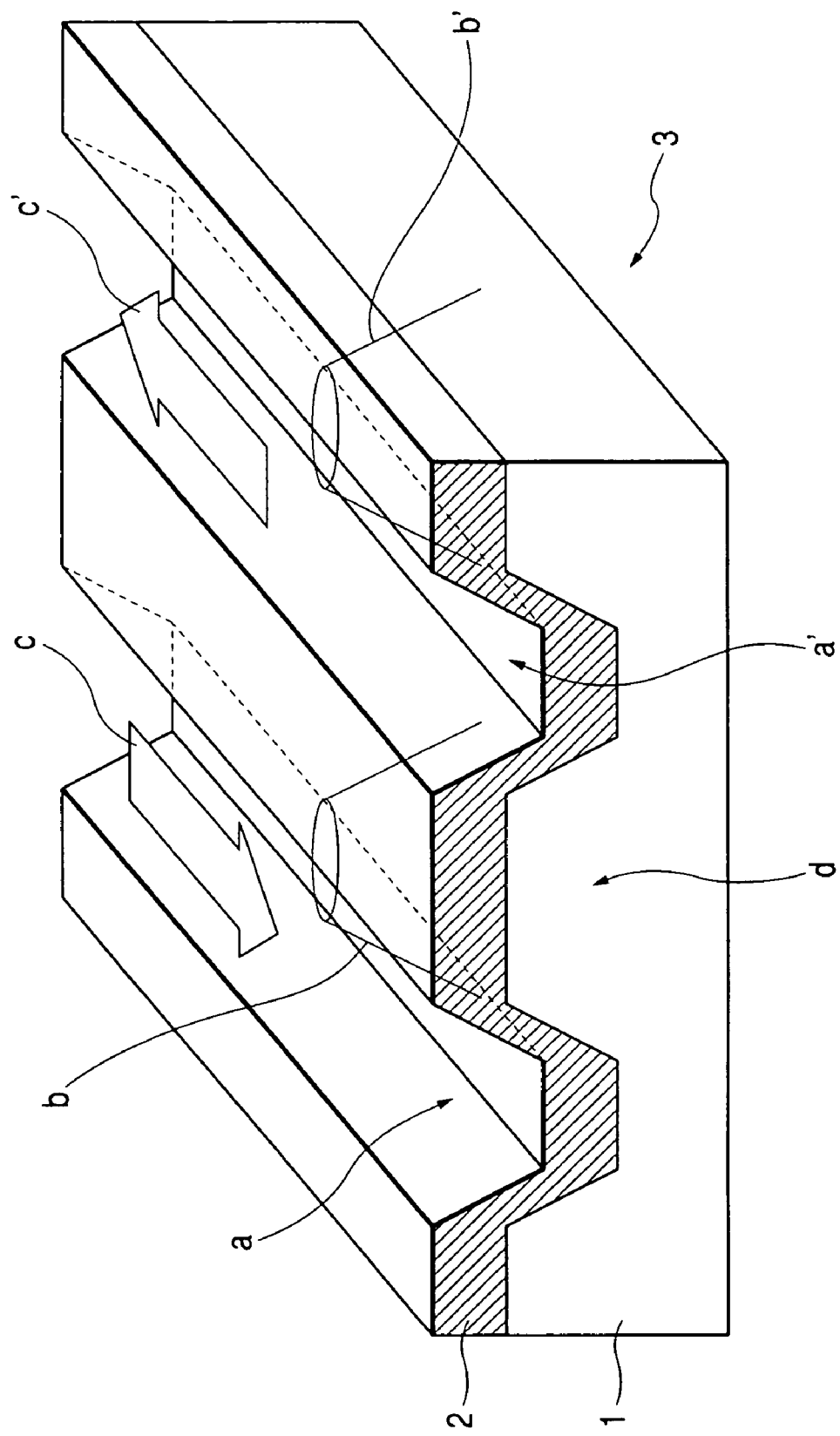
FIG. 9 shows a case where an annealing magnetic field parallel to a light beam scanning direction inside the disc surface is applied.
Figure 10:
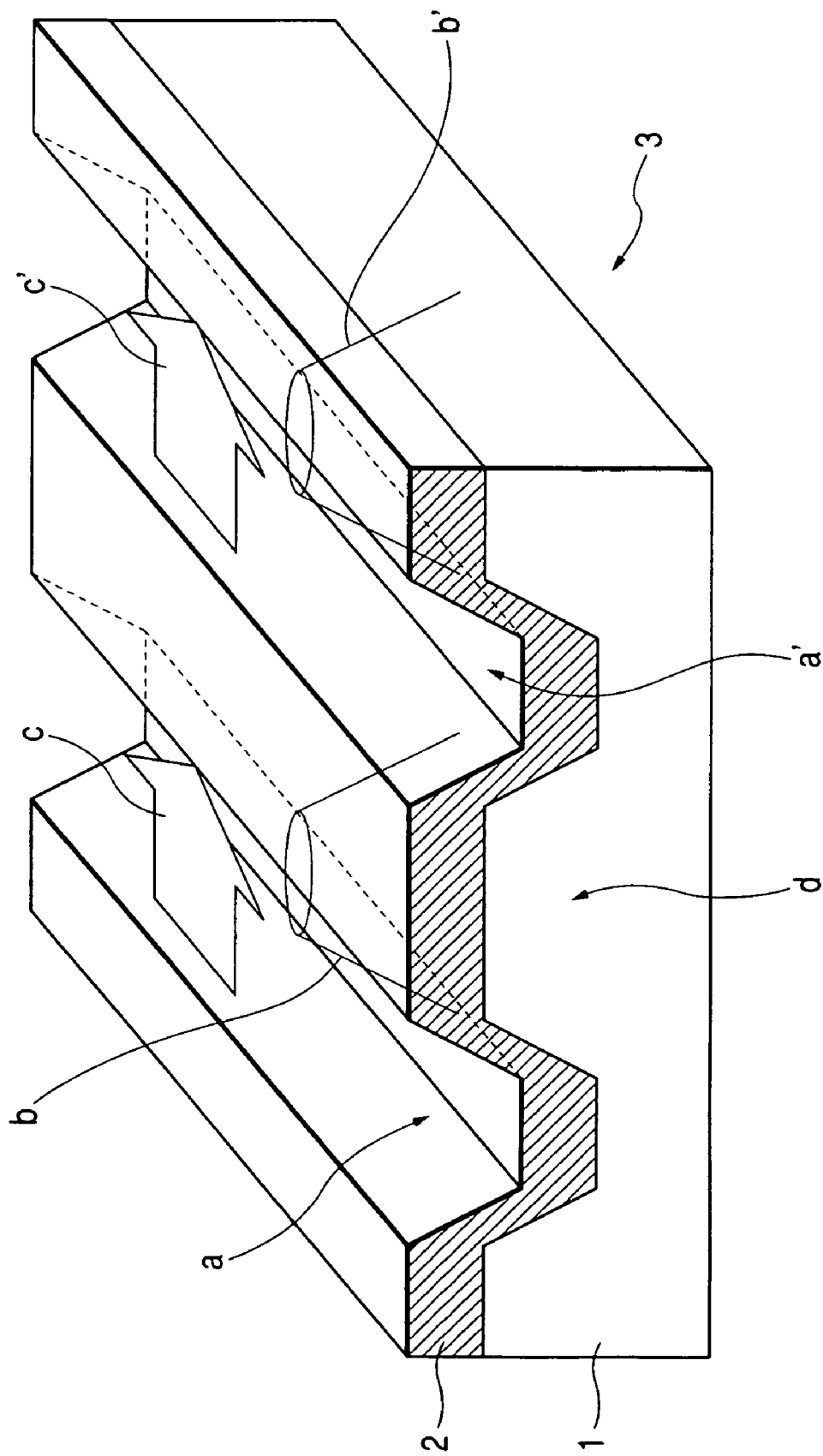
FIG. 10 shows a case where the annealing magnetic field perpendicular to the light beam scanning direction inside the disc surface is applied.
Figure 11A:
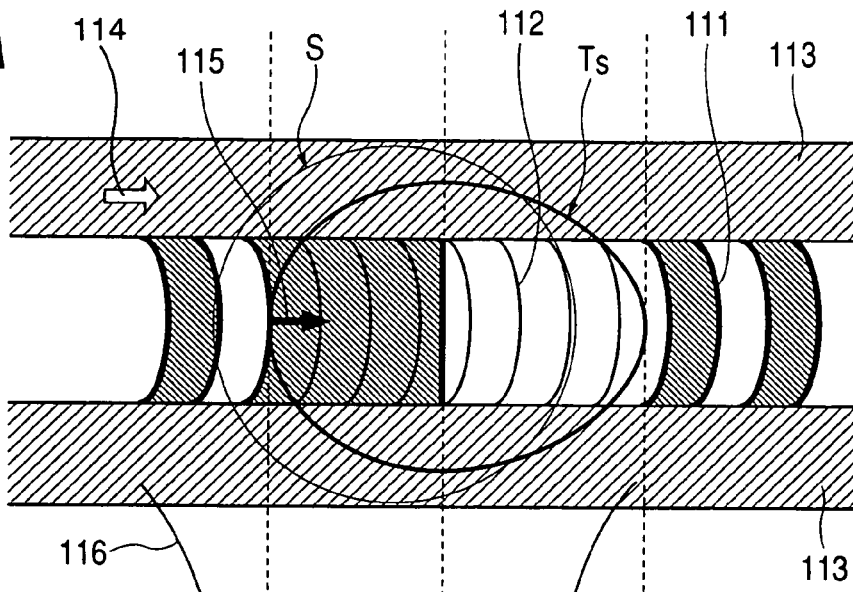
FIGS. 11A, 11B, 11C and 11D are a view to explain the reproducing method of a domain wall displacement type magneto-optical recording medium.
Figure 11B:
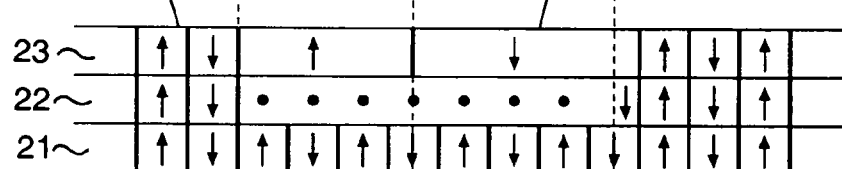
Figure 11C:
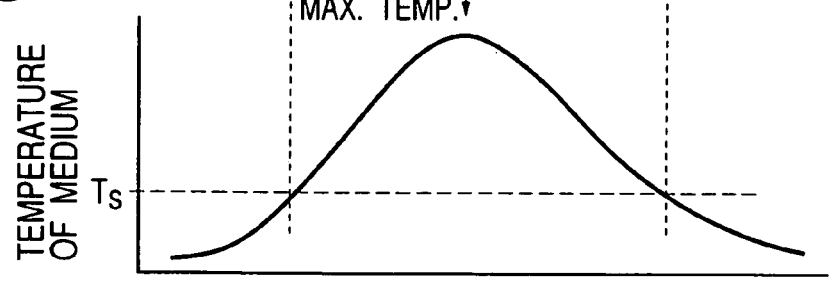
Figure 11D:
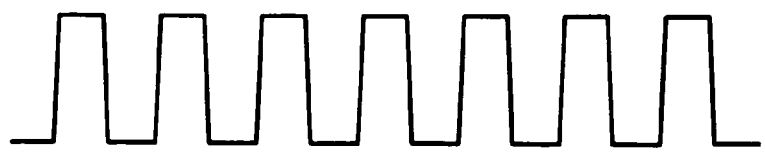

In FIG. 8 is shown a schematic diagram to show a property of the second embodiment of the annealing method of a magneto-optical disc of the present invention. In the drawing, what is different from embodiment 1 is that a ring head is used, where the magnetic disc 18, which applies the magnetic field at the time of annealing, can apply the annealing magnetic field in the in-plane direction of the face of the disc to a heated area on the recording medium. In this way, the magnetic field which is parallel to the magneto-optical disc surface can be applied to a heated annealing portion. In the case where the magnetic field is applied to the inside of the magneto-optical disc surface, there exist two directions parallel and perpendicular to the scanning direction of the light beam. In FIG. 9, an example of the annealing applied magnetic field was shown, where the annealing applied magnetic field is in the in-plane direction to the face of the magneto-optical disc and parallel to the light beam scanning direction. In the case where the annealing magnetic field is applied in this direction, it is not necessary to consider the polarity of the magnetic field and it does not matter whether it is the same polarity or different. In FIG. 10, an example of the annealing applied magnetic field, where the annealing magnetic field is perpendicular in the plane of the face of magneto-optical disc, is shown. In the case of FIG. 10, when the annealing magnetic field of the reverse polarity is applied, it is necessary to certainly apply the annealing magnetic field of the same polarity since there is a risk of the magnetic field line loop of the remanent magnetization owned by the adjacent anneal tracks being multiplied on the information recording track.

As shown in FIGS. 9 and 10, in order to change the polarity of the generated magnetic field to the scanning direction of the light beam, the direction of the ring head of FIG. 8 may be changed 90°. As already described as above, in FIG. 10, although the annealing applied magnetic fields have the same polarity, the polarity of the applied magnetic field does not cause any specific problem in the case where the annealing applied magnetic fields are parallel to the light beam scanning direction. Further, in the present embodiment, though the ring head was used in order to generate the magnetic field parallel to the magneto-optical disc surface, there is no limit to this, but it does not matter specifically whatever shape it has, provided the magnetic field parallel to the magneto-optical disc surface can be applied to the laser irradiated portion at the time of annealing.

In this way, the remanent magnetization at the boundary between the anneal track, where, though there is a deterioration of the magnetic property due to the laser annealing of the present invention, the magnetic property is not lost completely, and the information recording track is directed to the direction of the inside of the magneto-optical disc surface, so that the influence can be reduced for the magnetic area of the perpendicular direction recorded in the information recording track, and it is further possible to equalize the influence.

Note that the remanent magnetization at the time of the above described annealing is confirmed not to be inversed by the usually used recording power and the recording magnetic field.

As described above, the remanent magnetization at the boundary between the anneal track, where, though there is a deterioration of the magnetic property due to the laser annealing of the present invention, the magnetic property is not lost completely, and the information recording track is equalized and the influence of the remanent magnetization is taken as a predetermined polarity by both of the anneal tracks which make the information recording tracks exist between them, so that a bad influence on the information recording track can be offset, and the jitter property and the pulse width fluctuation can be improved. Further, the remanent magnetization at the boundary between the anneal track and the information recording track is directed to the direction of the inside of the magneto-optical disc surface, so that the influence for the magnetic area in the perpendicular direction recorded in the information recording track can be equalized. In this way, the reproduction signal having higher quality than that of the conventional method can be obtained. Furthermore, since the information recording track width can be made narrower than that of the conventional method, it is possible to further improve the recording density of the magneto-optical disc.

What is claimed is:

1. A domain wall displacement type magneto-optical disc comprising:
    a domain wall displacement layer in which a domain wall displaces;
    a memory layer that holds a recording magnetic domain according to information;
    a switching layer that is provided between the domain wall displacement layer and the memory layer and has a Curie temperature lower than that of those layers; and
    a disconnecting area that is provided in the domain wall displacement layer and disconnects a switching connection between information tracks;
    wherein the polarity of a residual magnetization at a boundary between the information track and the disconnection area is oriented in a predetermined direction.

2. The domain wall displacement type magneto-optical disc according to claim 1, wherein the direction of said residual magnetization is switched in polarity at a predetermined cycle.

3. The domain wall displacement type magneto-optical disc according to claim 2, wherein said switching occurs one cycle of the disc as an unit.

* * * * *